(12) United States Patent
Fukasaku et al.

(10) Patent No.: US 9,394,907 B2
(45) Date of Patent: Jul. 19, 2016

(54) MOTOR-DRIVEN COMPRESSOR HAVING CLUSTER BLOCK LOCATED RADIALLY INWARD OF A COIL END

(71) Applicant: KABUSHIKI KAISHA TOYOTA JIDOSHOKKI, Kariya-shi, Aichi-ken (JP)

(72) Inventors: Hiroshi Fukasaku, Kariya (JP); Takuro Yamashita, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 220 days.

(21) Appl. No.: 13/959,956

(22) Filed: Aug. 6, 2013

(65) Prior Publication Data

US 2014/0044573 A1 Feb. 13, 2014

(30) Foreign Application Priority Data

Aug. 8, 2012 (JP) .................. 2012-176160

(51) Int. Cl.
*H02K 3/38* (2006.01)
*F04C 29/00* (2006.01)
(Continued)

(52) U.S. Cl.
CPC ........... *F04C 29/0085* (2013.01); *F04C 23/008* (2013.01); *H02K 3/50* (2013.01); *F04C 18/0215* (2013.01); *F04C 2240/803* (2013.01); *F04C 2240/808* (2013.01)

(58) Field of Classification Search
CPC ........... H02K 3/38; H02K 3/50; H02K 5/225; F04C 2240/803; F04C 2240/808
USPC ................. 417/410.1, 410.5, 423.7; 310/71
See application file for complete search history.

(56) References Cited

U.S. PATENT DOCUMENTS 8,323,005 B2 * 12/2012 Yamada et al. ............ 417/410.1
2005/0088049 A1    4/2005 De Filippis et al.
(Continued)

FOREIGN PATENT DOCUMENTS

CN    2248417 Y    2/1997
CN    1638232 A    7/2005
(Continued)

OTHER PUBLICATIONS

Machine Translation of JP 06-052978 B, published patent version of JP 03-273843 A, published 1994, retrieved from J-plat-pat (https://www.j-platpat.inpit.go.jp/web/all/top/BTmTopEnglishPage) on May 8, 2015.*

(Continued)

*Primary Examiner* — Patrick Hamo
(74) *Attorney, Agent, or Firm* — Sughrue Mion, PLLC

(57) ABSTRACT

A motor-driven compressor includes an electric motor including a stator and a rotor, wherein the stator includes a stator core and a coil end projecting from the stator core, a rotation shaft, a compression unit, a motor driving circuit, a housing accommodating the compression unit, the electric motor, and the motor driving circuit sequentially arranged in an axial direction of the rotation shaft, a conductor configured to electrically connect the motor driving circuit to the electric motor, a lead extending from the coil end, a connection terminal electrically connecting the conductor to the lead, and a cluster block accommodating the connection terminal. The cluster block is arranged in the housing. The cluster block is coupled to the stator with at least part of the cluster block located inward from the coil end in a radial direction of the rotation shaft.

9 Claims, 4 Drawing Sheets

(51) Int. Cl.
  *F04C 23/00* (2006.01)
  *H02K 3/50* (2006.01)
  *F04C 18/02* (2006.01)

(56) References Cited

U.S. PATENT DOCUMENTS

| | | | |
|---|---|---|---|
| 2009/0097993 A1 | 4/2009 | Ryu et al. | |
| 2011/0020153 A1 | 1/2011 | Murakami | |
| 2011/0058973 A1* | 3/2011 | Yamada et al. | 418/55.1 |
| 2012/0230849 A1* | 9/2012 | Yamada et al. | 417/410.1 |

FOREIGN PATENT DOCUMENTS

| | | |
|---|---|---|
| CN | 1941557 A | 4/2007 |
| EP | 0711020 A2 | 5/1996 |
| JP | 644878 U | 1/1989 |
| JP | 03273843 A * | 12/1991 ............ 310/71 |
| JP | 2004282928 A | 10/2004 |
| JP | 2006-042409 A | 2/2006 |
| JP | 1941557 A | 4/2007 |
| JP | 2009-264172 A | 11/2009 |
| JP | 2010-059809 A | 3/2010 |

OTHER PUBLICATIONS

Communication dated Jun. 23, 2015, issued by the State Intellectual Property Office of the People's Republic of China in corresponding Chinese Application No. 201310339539.5.
Communication dated Sep. 29, 2015 from the Japanese Patent Office in counterpart application No. 2012-176160.

* cited by examiner

US 9,394,907 B2

MOTOR-DRIVEN COMPRESSOR HAVING CLUSTER BLOCK LOCATED RADIALLY INWARD OF A COIL END

BACKGROUND OF THE INVENTION

The present invention relates to a motor-driven compressor including a compression unit, an electric motor, and a motor driving circuit sequentially arranged along the axial direction of a rotation shaft.

Japanese Laid-Open Patent Publication No. 2009-264172 describes a motor-driven compressor including a conductor (air-tight terminal), which electrically connects a motor driving circuit to an electric motor, and a lead (motor lead), which is drawn out of the electric motor. The conductor is electrically connected to the lead by a connection terminal (connector clip) accommodated in a cluster block arranged in a housing. The cluster block is arranged between coil ends of the electric motor and the motor driving circuit in the axial direction of the rotation shaft. The cluster block is positioned and fixed to the inner surface of the housing by a pin.

Japanese Laid-Open Patent Publication No. 2006-42409 describes a motor integrated compressor (motor-driven compressor) including a cluster block that is arranged radially outward from the stator and coupled to the outer circumferential surface of the stator core of the stator. The cluster block includes a dovetail projection, and the outer circumferential surface of the stator core includes a dovetail groove extending in the axial direction of the rotation shaft. The projection is inserted into and engaged with the groove. The engagement between the projection and the groove couples the cluster block to the outer circumferential surface of the stator core.

SUMMARY OF THE INVENTION

However, the cluster block of Japanese Laid-Open Patent Publication No. 2009-264172 is arranged between the coil ends and the motor driving circuit in the axial direction of the rotation shaft. Thus, the cluster block enlarges the motor-driven compressor in the axial direction of the rotation shaft. In addition, the cluster block of Japanese Laid-Open Patent Publication No. 2006-42409 is arranged radially outward from the stator and coupled to the outer circumferential surface of the stator core. Thus, the cluster block enlarges the motor-driven compressor in the radial direction of the rotation shaft.

It is an object of the present disclosure to provide a motor-driven compressor having a minimized size.

To achieve the above object, one aspect of the present invention is a motor-driven compressor that includes an electric motor including a stator and a rotor, wherein the stator includes a stator core and a coil end projecting from the stator core, a rotation shaft configured to rotate integrally with the rotor, a compression unit configured to be driven when the rotation shaft rotates, a motor driving circuit configured to drive the electric motor, a housing accommodating the compression unit, the electric motor, and the motor driving circuit sequentially arranged in an axial direction of the rotation shaft, a conductor configured to electrically connect the motor driving circuit to the electric motor, a lead extending from the coil end, wherein the coil end is located between the stator core and the motor driving circuit in the axial direction, a connection terminal electrically connecting the conductor to the lead, and a cluster block accommodating the connection terminal. The cluster block is arranged in the housing. The cluster block is coupled to the stator with at least part of the cluster block located inward from the coil end in a radial direction of the rotation shaft.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

Figure 1:
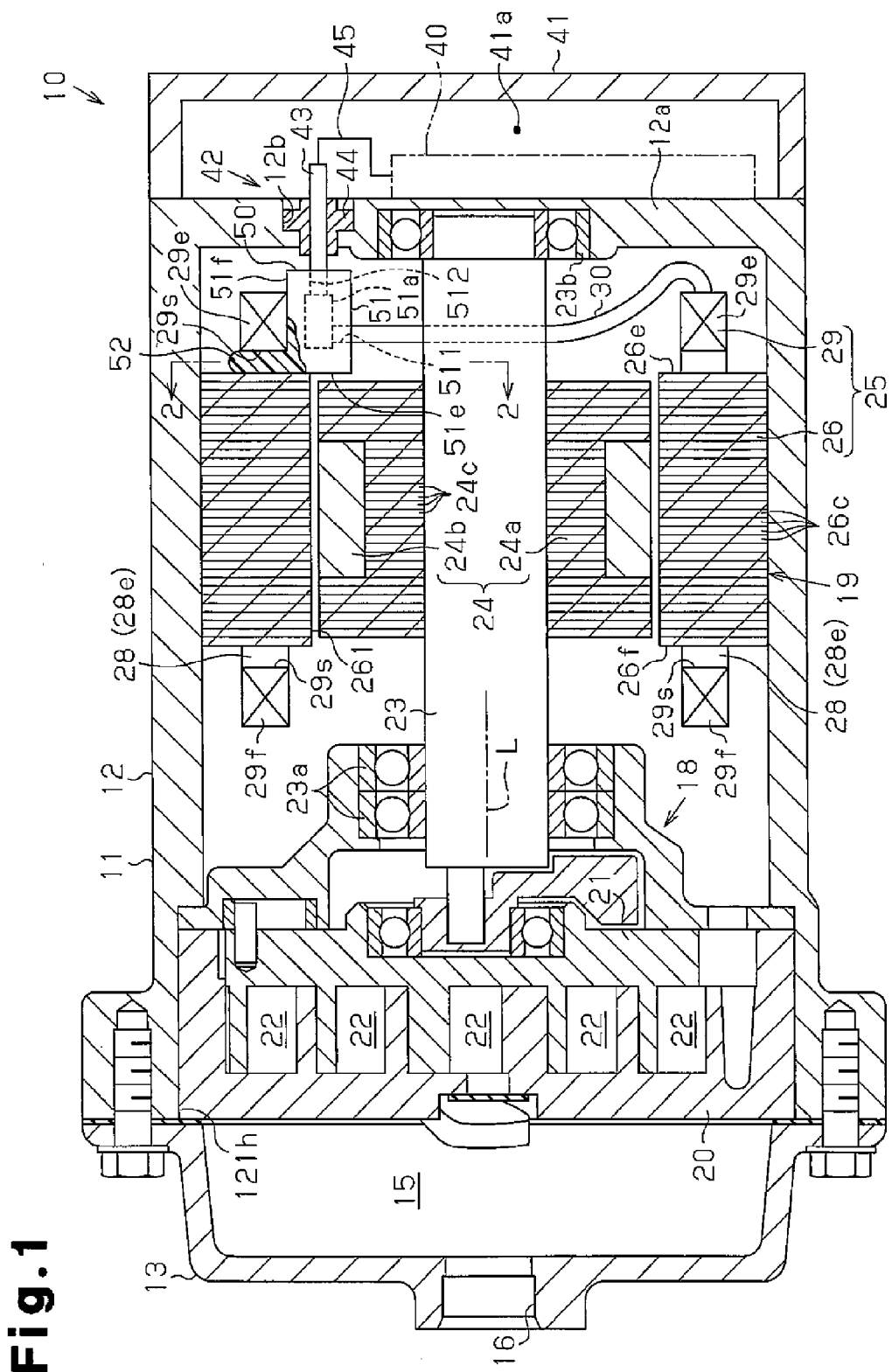
FIG. 1 is a longitudinal cross-sectional view showing the first embodiment of a motor-driven compressor.
Figure 2:
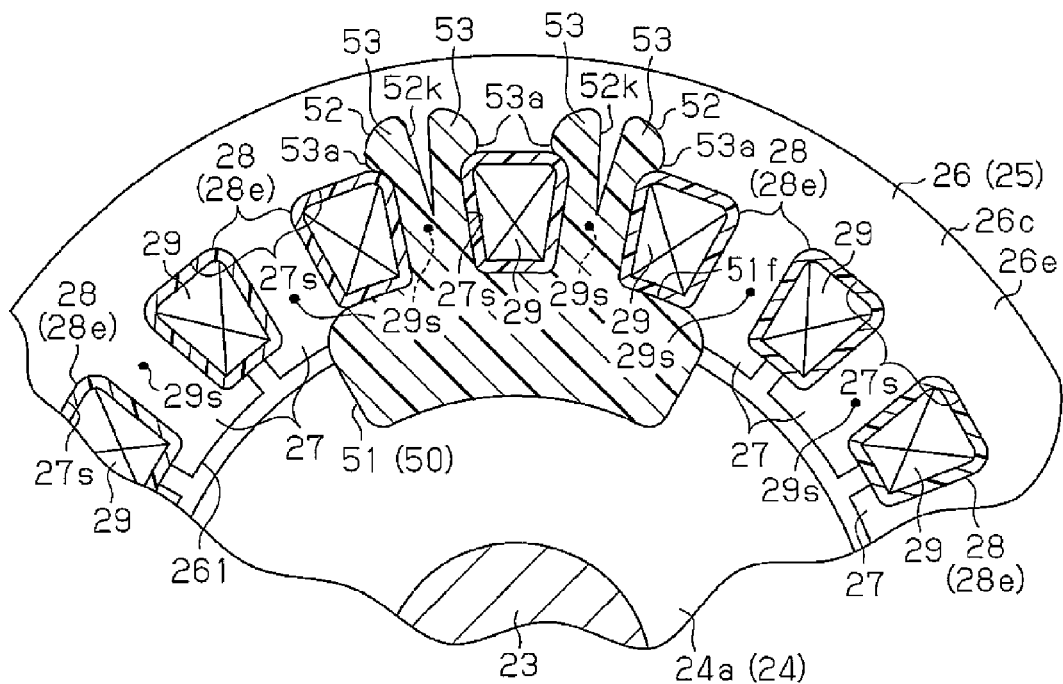
FIG. 2 is a cross-sectional view taken along line 2-2 in FIG. 1.

Referring to FIGS. 1 and 2, one embodiment will now be described.

As shown in FIG. 1, a motor-driven compressor 10 has a housing 11 including a motor housing member 12, a discharge housing member 13, and an inverter housing member 41. The motor housing member 12 is cylindrical and has an open end 121h (left side as viewed in FIG. 1) and a closed end forming an end wall 12a. The discharge housing member 13 is cylindrical, has a closed end, and is coupled to the open end 121h of the motor housing member 12. The inverter housing member 41 is cylindrical, has a closed end, and is coupled to the end wall 12a of the motor housing member 12. The motor housing member 12 and the discharge housing member 13 define a discharge chamber 15. The closed end of the discharge housing member 13 includes a discharge port 16 connected to an external refrigerant circuit (not shown). The motor housing member 12 has a circumferential wall including a suction port (not shown) connected to the external refrigerant circuit.

The motor housing member 12 accommodates a compression unit 18, which compresses refrigerant, and an electric motor 19, which drives the compression unit 18. The end wall 12a of the motor housing member 12 and the inverter housing member 41 define an accommodating chamber 41a. The accommodating chamber 41a accommodates a motor driving circuit 40 (indicated by the double-dashed lines in FIG. 1) coupled to the outer surface of the end wall 12a. In the present embodiment, the compression unit 18, the electric motor 19, and the motor driving circuit 40 are sequentially arranged in the axial direction of a rotation shaft 23.

The compression unit 18 includes a fixed scroll 20, which is fixed in the motor housing member 12, and a movable scroll 21, which is engaged with the fixed scroll 20. The fixed scroll 20 and the movable scroll 21 form a compression chamber 22 having a variable volume. The motor housing member 12 accommodates the rotation shaft 23. The rotation shaft 23 is supported by radial bearings 23a and 23b to be rotatable relative to the motor housing member 12.

The electric motor 19 is located closer to the end wall 12a of the motor housing member 12 (right side as viewed in FIG. 1) than the compression unit 18. The electric motor 19 includes a rotor 24, which rotates integrally with the rotation shaft 23, and a stator 25, which is fixed to the inner surface of the motor housing member 12 around the rotor 24.

The rotor 24 includes a cylindrical rotor core 24a fixed to the rotation shaft 23. A plurality of permanent magnets 24b is embedded in the rotor core 24a. The permanent magnets 24b are arranged along the circumferential direction of the rotor core 24a at equal intervals. The rotor core 24a includes a plurality of laminated magnetic core plates 24c (electromagnetic metal plates). The stator 25 includes an annular stator core 26, which is fixed to the inner surface of the motor housing member 12, and coils 29 arranged on the stator core 26. The stator core 26 includes a plurality of laminated magnetic core plates 26c (electromagnetic metal plates). The stator core 26 has a first end surface 26e and a second end surface 26f in the axial direction. The first end surface 26e faces toward the motor driving circuit 40.

As shown in FIG. 2, each core plate 26c has an inner circumference including a plurality of teeth 27 arranged in the circumferential direction of the stator core 26 at equal intervals. Adjacent teeth 27 define slots 27s arranged along the circumferential direction of the stator core 26 at equal intervals. The slots 27s accommodate the coils 29, which are wound around the teeth 27. A tubular insulating sheet 28 is arranged between the teeth 27 and the coil 29 in each slot 27c. Each insulating sheet 28 extends along the axis L of the rotation shaft 23 (in the axial direction) in the corresponding slot 27s. Each insulating sheet 28 includes two end portions projecting from the first and second end surfaces 26e and 26f of the stator core 26. In the following description, the term "axial direction" refers to the direction extending along the axis L of the rotation shaft 23, and the term "radial direction" refers to the direction extending radially from the rotation shaft 23.

As shown in FIG. 1, each of the two end portions of the insulating sheet 28 includes a cuff 28e. The cuff 28e has a bent distal end hooked to the corresponding one of the first and second end surfaces 26e and 26f of the stator core 26. This limits axial movement of the insulating sheets 28 in the slots 27c relative to the stator core 26. Each coil 29 of the electric motor 19 has a primary end and a secondary end that project from the stator core 26. In the description below, the primary end is referred to as a primary coil end 29e, and the secondary end is referred to as a secondary coil end 29f. The primary coil ends 29e are located between the stator core 26 and the motor driving circuit 40 in the axial direction. Leads 30 for U, V, and W phases (only one lead shown in FIG. 1) extend from the primary coil ends 29e.

As shown in FIGS. 1 and 2, gaps 29s are formed in the axial direction between the first end surface 26e of the stator core 26 and the primary coil ends 29e and between the second end surface 26f of the stator core 26 and the secondary coil ends 29f. The gaps 29s are located between the adjacent insulating sheets 28 in the circumferential direction of the stator core 26. The gaps 29s are voids defined by the coil ends 29e and 29f. The voids are formed since the end portions of the insulating sheets 28 project from the end surfaces 26e and 26f. The gaps 29s insulate the end surfaces 26e and 26f from the coil ends 29e and 29f.

The end wall 12a of the motor housing member 12 includes a through hole 12b that receives a sealing terminal 42. The sealing terminal 42 includes three sets of a metal terminal 43 and a glass insulator 44 (only one set shown in FIG. 1). The metal terminals 43 serve as conductors electrically connecting the electric motor 19 to the motor driving circuit 40. Each glass insulator 44 fixes the corresponding metal terminal 43 to the end wall 12a and insulates the metal terminal 43 from the end wall 12a. Each metal terminal 43 has a primary end connected to the motor driving circuit 40 by a cable 45 and a secondary end extending into the motor housing member 12.

The motor housing member 12 accommodates a rectangular cluster block 50 that is arranged radially inward from the primary coil ends 29e and coupled to the stator 25. The cluster block 50 includes a main body 51 accommodating a connection terminal 51a. The main body 51 has a lower surface including three primary insertion holes 511 (only one shown in FIG. 1). The leads 30 extend through the primary insertion holes 511 and are connected to the connection terminal 51a. The main body 51 includes an end surface facing toward the motor driving circuit 40 and including three secondary insertion holes 512 (only one shown in FIG. 1). The secondary ends of the metal terminals 43 extend through the secondary insertion holes 512 and are electrically connected to the connection terminal 51a. The main body 51 also includes an end surface 51e opposite to the end surface facing toward the motor driving circuit 40.

As shown in FIG. 2, the main body 51 includes an upper surface 51f that is arcuate in conformance with the stator core 26 in the circumferential direction and extends in the axial direction. Two inserting projections 52 extend radially outward from the upper surface 51f of the main body 51 (only one shown in FIG. 1). The inserting projections 52 are separated from each other by a distance that is set in conformance with the coils 29 and the insulating sheets 28 in the slots 27s.

Each inserting projection 52 has a distal portion including a slit 52k extending from the distal end toward the proximal end. The slit 52k forms two hooking projections 53 in the distal portion of the inserting projection 52. The hooking projections 53 are movable toward and away from each other. The hooking projections 53 have distal ends including hooking portions 53a protruding away from each other. Each inserting projection 52 is insertable into the corresponding gap 29s. Each insulating sheet 28 includes an outer portion and an inner portion in the radial direction. The distance between the distal end of the inserting projection 52 and the upper surface 51f of the main body 51 is set such that the hooking portions 53a projects radially outward from the outer portions of the insulating sheets 28.

When inserting the inserting projections 52 into the gaps 29s, the hooking portions 53a come into contact with the inner portions of the insulating sheets 28. This moves the hooking projections 53 of each inserting projection 52 toward each other and allows the inserting projections 52 to be inserted into the gaps 29s. Then, when the inserting projections 52 are further inserted through the gaps 29s, the hooking portions 53a project out of the outer portions of the insulating sheets 28, and the hooking projections 53 move away from each other to return to their original positions. Thus, the hooking portions 53a are engaged with the outer portions of the insulating sheets 28. This couples the cluster block 50 to the stator 25.

When the cluster block 50 is coupled to the stator 25, the upper surface 51f of the main body 51 is located radially outward from the inner circumferential surface 261 of the stator core 26. Thus, as shown in FIG. 1, the end surface 51e of the main body 51 that is opposite to the side facing toward the metal terminals 43 faces the first end surface 26e of the stator core 26.

In the motor-driven compressor 10 of the present embodiment, when power controlled by the motor driving circuit 40 is supplied to the electric motor 19, the rotor 24 and the rotation shaft 23 rotate at a controlled rotation speed. This drives the compression unit 18. The driving of the compression unit 18 draws refrigerant from the external refrigerant circuit into the motor housing member 12 through the suction port, compresses the refrigerant in the motor housing member 12 with the compression unit 18, and discharges the compressed refrigerant to the external refrigerant circuit through the discharge port 16.

The operation of the first embodiment will now be described.

The cluster block 50 is arranged radially inward from the primary coil ends 29e and coupled to the stator 25 by inserting the inserting projections 52 into the gaps 29s between the first end surface 26e of the stator core 26 and the primary coil ends 29e. This reduces the size of the motor-driven compressor 10 in the axial direction compared to when the cluster block 50 is located between the primary coil ends 29e and the motor driving circuit 40 in the axial direction. Further, the size of the motor-driven compressor 10 in the radial direction is reduced compared to when the cluster block 50 is located at the outer side of the outer circumference of the stator 25.

The engagement between the hooking portions 53a and the outer portions of the insulating sheets 28 prevent separation of the inserting projections 52 toward the inside of the primary coil ends 29e. In addition, the engagement between the hooking portions 53a and the outer portions of the insulating sheets 28 and the contact between the upper surface 51f of the main body 51 and the inner portions of the insulating sheets 28 limit the radial movement of the cluster block 50 relative to the stator 25. Further, the contact between the inserting projections 52 and the first end surface 26e of the stator core 26 and the contact between the inserting projections 52 and the primary coil ends 29e limit the axial movement of the cluster block 50 relative to the stator 25. Additionally, the contact between the inserting projections 52 and the adjacent insulating sheets 28 limits the movement of the cluster block 50 relative to the stator 25 in the circumferential direction of the stator core 26.

When the cluster block 50 is coupled to the stator 25, the end surface 51e of the main body 51 faces the first end surface 26e of the stator core 26. Accordingly, when the stator 25 to which the cluster block 50 is coupled is arranged in the motor housing member 12 and the sealing terminal 42 is arranged in the through hole 12b, the load applied to the cluster block 50 when connecting the metal terminals 43 to the connection terminal 51a is received by the first end surface 26e of the stator core 26 that comes into contact with the end surface 51e of the main body 51. This limits the movement of the cluster block 50 relative to the stator 25 toward the compression unit 18 when connecting the metal terminals 43 to the connection terminal 51a.

The advantages of the present embodiment will now be described.

(1) The cluster block 50 is located radially inward from the primary coil ends 29e and coupled to the stator 25. This reduces the axial size of the motor-driven compressor 10 compared to when the cluster block 50 is arranged between the primary coil ends 29e and the motor driving circuit 40 in the axial direction. Further, the radial size of the motor-driven compressor 10 can be reduced compared when the cluster block 50 is arranged outside the stator 25. Consequently, the motor-driven compressor 10 can be significantly reduced in size.

(2) The cluster block 50 is coupled to the stator 25 by inserting the inserting projections 52 into the gaps 29s, which are voids defined by the primary coil ends 29e. Thus, the cluster block 50 can be coupled to the stator 25 just by inserting the inserting projections 52 into the gaps 29s.

(3) The inserting projections 52 are inserted into the gaps 29s formed between the first end surface 26e of the stator core 26 and the primary coil ends 29e in the axial direction. The presence of the gaps 29s, which are necessary to insulate the first end surface 26e of the stator core 26 from the primary coil ends 29e, eliminates the need for additionally forming voids for insertion of the inserting projection 52 into the primary coil ends 29e. The cluster block 50 can be coupled to the stator 25 by inserting the inserting projections 52 into the gaps 29s, which are existing voids between the first end surface 26e of the stator core 26 and the primary coil ends 29e.

(4) The hooking portions 53a are engaged with the outer portions of the insulating sheets 28. Thus, the inserting projections 52 in the gaps 29s are not easily pulled out toward inside of the primary coil ends 29e.

(5) The two inserting projections 52 extend from the upper surface 51f of the main body 51. The cluster block 50 is coupled to the stator 25 by inserting these inserting projections 52 into the gaps 29s. This reinforces the coupling between the cluster block 50 and the stator 25 compared to when only one inserting projection 52 extends from the upper surface 51f of the main body 51 and is inserted into one of the gaps 29s to couple the cluster block 50 to the stator 25, for example.

(6) When the cluster block 50 is coupled to the stator 25, the end surface 51e of the main body 51 faces the first end surface 26e of the stator core 26. Thus, when the stator 25 to which the cluster block 50 is coupled is arranged in the motor housing member 12 and the sealing terminal 42 is arranged in the through hole 12b, the load applied to the cluster block 50 when connecting the metal terminals 43 to the connection terminal 51a is received by the first end surface 26e of the stator core 26 that comes into contact with the end surface 51e of the main body 51. This limits the movement of the cluster block 50 relative to the stator 25 toward the compression unit 18 when connecting the metal terminals 43 to the connection terminal 51a. Further, the tasks of connecting the metal terminals 43 and the connection terminal 51a are facilitated.

(7) In the present embodiment, the formation of the voids that receive the inserting projections 52 to couple the cluster block 50 to the stator 25 is achieved without forming any holes or cutting out parts from the stator core 26. Thus, the magnetic flux in the teeth 27 of the stator core 26 is not disturbed.

Second Embodiment

Figure 3:
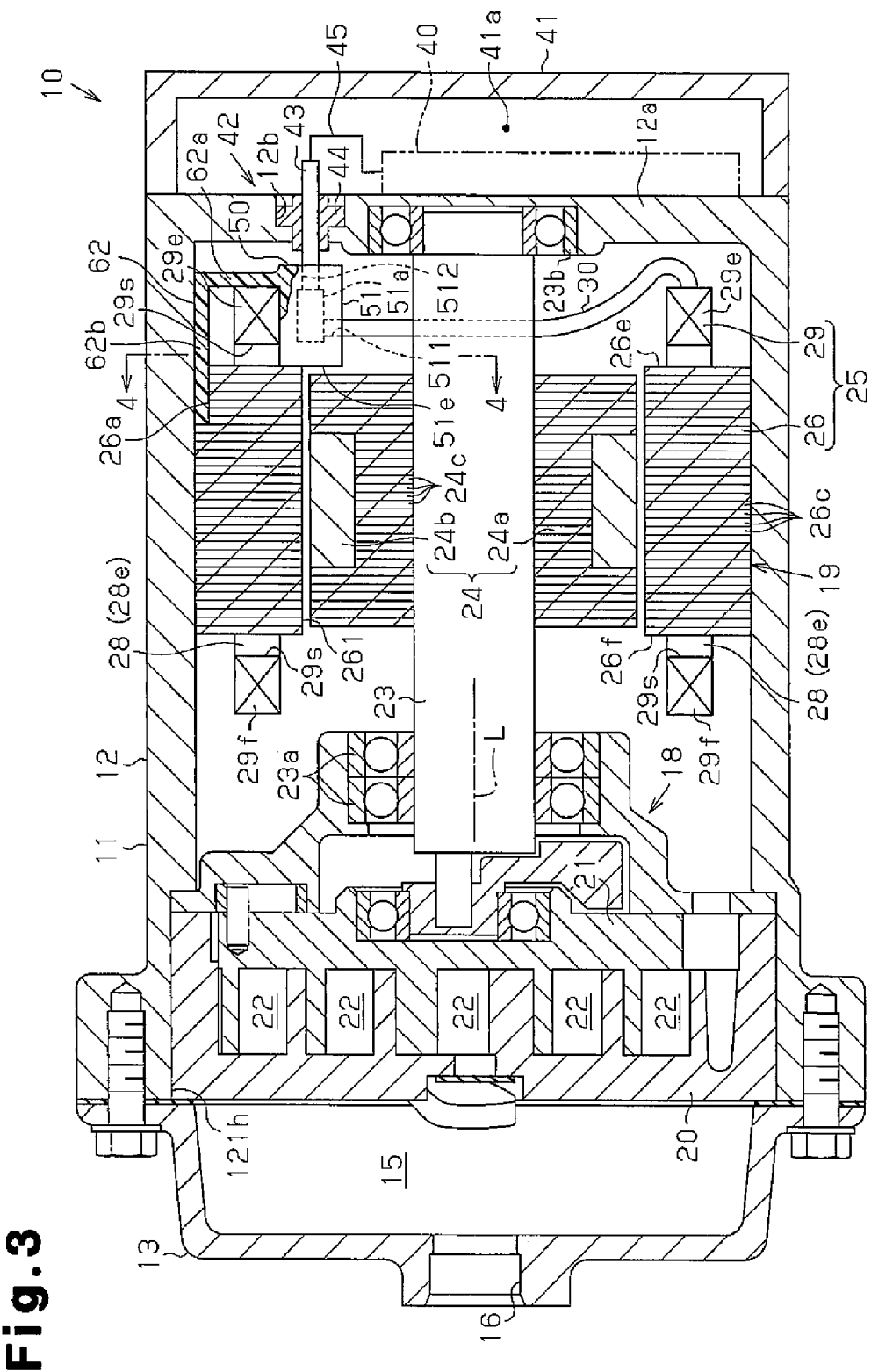
FIG. 3 is a cross-sectional view showing the second embodiment of a motor-driven compressor.
Figure 4:
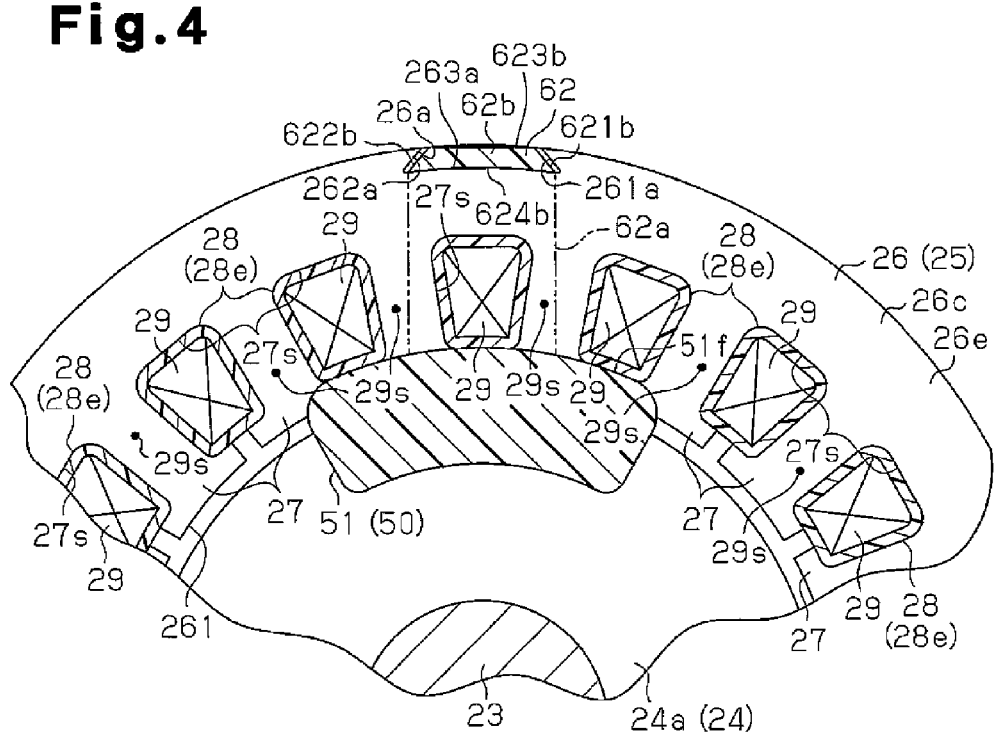
FIG. 4 is a cross-sectional view taken along line 4-4 in FIG. 3.
Figure 5:
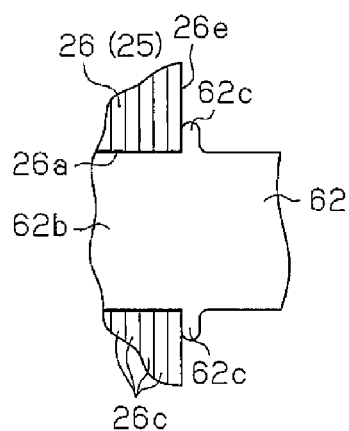
FIG. 5 is a plan view showing another embodiment in which a contact portion is in contact with an end surface of the stator core facing toward the motor driving circuit.

Referring to FIGS. 3 and 4, a second embodiment will now be described. Same reference numerals are given to those components that are the same as the corresponding components of the first embodiment. Such components will not be described in detail.

As shown in FIGS. 3 and 4, the outer circumferential surface of the stator core 26 includes a groove 26a near the motor driving circuit 40. The groove 26a extends in the axial direction and serves as a receiving portion. The groove 26a opens to the first end surface 26e and is formed by cutting out part of the outer circumferential surfaces of some (seven in the present embodiment) of the core plates 26c.

As shown in FIG. 4, the groove 26a is defined by two flat side walls 261a and 262a, which are inclined toward each other in the radially outward direction, and a flat inner wall 263a, which extends between the radial inner ends of the side walls 261a and 262a.

As shown in FIGS. 3 and 4, an inserting projection 62 extends from the upper surface 51f of the main body 51. The inserting projection 62 includes a planar extension 62a and a planar inserting portion 62b. The extension 62a extends from the upper surface 51f of the main body 51 in the radial direction and has a distal end located radially outward from the primary coil ends 29e. The inserting portion 62b extends from the distal end of the extension 62a toward the first end surface 26e of the stator core 26. The extension 62a is closer to the motor driving circuit 40 than the primary coil ends 29e in the axial direction. The inserting portion 62b extends in the axial direction and has a distal end insertable into the groove 26a.

As shown in FIG. 4, the inserting portion 62b includes flat side walls 621b and 622b, which extend along the side walls 261a and 262a of the groove 26a, an outer wall 623b, which connects the radial outer ends of the side walls 621b and 622b, and an inner wall 624b, which connects the radial inner ends of the side walls 621b and 622b. The main body 51 is arranged radially inward from the primary coil ends 29e. The cluster block 50 is coupled to the stator 25 by inserting the distal end of the inserting portion 62b into the groove 26a.

The operation of the second embodiment will now be described.

The contact between the side walls 621b and 622b of the inserting portion 62b and the side walls 261a and 262a of the groove 26a, and the contact between the inner wall 624b of the inserting portion 62b and the inner wall 263a of the groove 26a limit the radial movement of the cluster block 50 relative to the stator core 26. Further, the contact between the side walls 621b and 622b of the inserting portion 62b and the side walls 261a and 262a of the groove 26a limits the movement of the cluster block 50 relative to the stator core 26 in the circumferential direction of the stator core 26.

Accordingly, the second embodiment has the following advantage in addition to advantages (1) and (6) of the first embodiment.

(8) The outer circumferential surface of the stator core 26 includes the groove 26a. The inserting projection 62 extends from the upper surface 51f of the main body 51. The inserting projection 62 includes the extension 62a, which extends from the upper surface 51f of the main body 51 in the radial direction and includes the distal end located radially outward from the primary coil ends 29e, and the inserting portion 62b, which extends from the distal end of the extension 62a toward the first end surface 26e of the stator core 26. Thus, the cluster block 50 can be coupled to the stator 25 just by arranging the main body 51 radially inward from the primary coil ends 29e and inserting the distal end of the inserting portion 62b into the groove 26a.

It should be apparent to those skilled in the art that the present invention may be embodied in many other specific forms without departing from the spirit or scope of the invention. Particularly, it should be understood that the present invention may be embodied in the following forms.

In the second embodiment, the inserting portion 62b may include contact portions 62c that can come into contact with the first end surface 26e of the stator core 26. The contact portions 62c project from the opposite sides of the inserting portion 62b perpendicular to the direction in which the inserting portion 62b extends. Thus, when the stator core 26 to which the cluster block 50 is coupled is arranged in the motor housing member 12, the load applied to the cluster block 50 when connecting the metal terminals 43 to the connection terminal 51a is received by the first end surface 26e of the stator core 26 that comes into contact with the contact portions 62c. This further limits the movement of the cluster block 50 relative to the stator core 26 toward the compression unit 18 when connecting the metal terminals 43 to the connection terminal 51a and facilitates the connecting task between the metal terminals 43 and the connection terminal 51a.

In the second embodiment, an insertion hole that extends in the axial direction and serves as a receiving portion may be arranged by forming through holes in some (seven in this embodiment) of the core plate 26c. The cluster block 50 may be coupled to the stator 25 by inserting the inserting portion 62b into the insertion hole.

In the first embodiment, the inserting projections 52 may be inserted into any voids as long as the voids are formed by the primary coil ends 29e and the cluster block 50 can be coupled to the stator 25 by inserting the inserting projections 52 into the voids.

In the first embodiment, there is no limitation on the number of the inserting projections 52.

In the first embodiment, each inserting projection 52 does not have to include the slit 52k.

In the first embodiment, each inserting projection 52 does not have to include the hooking portion 53a.

In the first embodiment, the hooking portions 53a may be engaged with the coils 29, for example. Any structure may be employed as long as the hooking portions 53a are engaged with the stator 25.

When the cluster block 50 is coupled to the stator 25, the end surface 51e of the main body 51 does not have to be in contact with the first end surface 26e of the stator core 26.

When the cluster block 50 is coupled to the stator 25, the upper surface 51f of the main body 51 may be located radially inward from the inner circumferential surface 261 of the stator core 26. That is, the end surface 51e of the main body 51 does not have to face the first end surface 26e of the stator core 26. When connecting the metal terminals 43 to the connection terminal 51a in this structure, a jig may be used to limit the movement of the cluster block 50 relative to the stator 25 toward the compression unit 18.

The entire cluster block 50 is not required to be located radially inward from the primary coil ends 29e as long as at least part of the cluster block 50 is located radially inward from the primary coil ends 29e.

The compression unit 18 may be of a piston type or a vane type, for example.

Therefore, the present examples and embodiments are to be considered as illustrative and not restrictive and the invention is not to be limited to the details given herein, but may be modified within the scope and equivalence of the appended claims.

The invention claimed is:

1. A motor-driven compressor comprising:
    an electric motor including a stator and a rotor, wherein the stator includes a stator core and a coil end projecting from the stator core;
    a rotation shaft configured to rotate integrally with the rotor;
    a compression unit configured to be driven when the rotation shaft rotates;
    a motor driving circuit configured to drive the electric motor;
    a housing accommodating the compression unit, the electric motor, and the motor driving circuit sequentially arranged in an axial direction of the rotation shaft;
    a conductor configured to electrically connect the motor driving circuit to the electric motor;
    a lead extending from the coil end, wherein the coil end is located between the stator core and the motor driving circuit in the axial direction;

a connection terminal electrically connecting the conductor to the lead; and a cluster block accommodating the connection terminal, wherein the cluster block is arranged in the housing, and the cluster block is coupled to the stator with at least part of the cluster block located inward from the coil end in a radial direction of the rotation shaft and at least partially overlapping the coil end in the axial direction of the rotation shaft, and the cluster block includes a main body and an inserting projection, wherein the main body is arranged between the coil end and the rotation shaft with at least part of the main body facing the rotor.

2. The motor-driven compressor according to claim 1, wherein the main body accommodates the connection terminal and the inserting projection extends from the main body, and the cluster block is coupled to the stator by inserting the inserting projection into a void formed by the coil end.

3. The motor-driven compressor according to claim 2, wherein the stator core includes an end surface facing toward the motor driving circuit, and the void includes a gap extending between the coil end and the end surface of the stator core.

4. The motor-driven compressor according to claim 2, wherein the inserting projection includes a hooking portion configured to be engageable with the stator.

5. The motor-driven compressor according to claim 2, wherein the inserting projection is one of a plurality of inserting projections extending from the main body, the void is one of a plurality of voids, and the inserting projections are each inserted into one of the voids.

6. The motor-driven compressor according to claim 1, wherein the main body accommodates the connection terminal, and the inserting projection extends from the main body, the stator core includes an end surface facing toward the motor driving circuit, the inserting projection includes an extension, which extends from the main body along the radial direction of the rotation shaft and has a distal end located radially outward from the coil end, and an inserting portion, which extends from the distal end of the extension toward the end surface of the stator core, the stator core includes a receiving portion into which the inserting portion is inserted, and the cluster block is coupled to the stator by inserting the inserting portion into the receiving portion.

7. The motor-driven compressor according to claim 6, wherein the inserting portion includes a contact portion configured to allow for contact between the end surface of the stator core and the contact portion.

8. The motor-driven compressor according to claim 2, wherein the main body includes an end surface located on a first side of the main body that is opposite a second side of the main body facing the conductor, and the end surface of the main body faces the end surface of the stator core.

9. The motor-driven compressor according to claim 6, wherein the main body includes an end surface located on a first side of the main body that is opposite a second side of the main body facing the conductor, and the end surface of the main body faces the end surface of the stator core.

* * * * *